US009581343B2

(12) United States Patent
Berger et al.

(10) Patent No.: US 9,581,343 B2
(45) Date of Patent: Feb. 28, 2017

(54) AIR-CONDITIONING UNIT (71) Applicant: Mahle International GmbH, Stuttgart (DE)

(72) Inventors: Michael Berger, Kirchberg an der Murr (DE); Michael Herrmann, Stuttgart (DE); Holger Laux, Dietingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/924,426

(22) Filed: Oct. 27, 2015

(65) Prior Publication Data
US 2016/0116173 A1   Apr. 28, 2016

(30) Foreign Application Priority Data

Oct. 28, 2014   (DE) .................. 10 2014 221 955

(51) Int. Cl.
*F25D 21/14* (2006.01)
*F24H 3/06* (2006.01)
(Continued)

(52) U.S. Cl.
CPC .......... *F24F 1/0011* (2013.01); *B60H 1/3233* (2013.01); *F24F 1/0022* (2013.01); *F24F 13/20* (2013.01); *F24F 13/222* (2013.01)

(58) Field of Classification Search
CPC ...... F24F 1/0011; F24F 1/0022; F24F 13/222; F24F 13/20; B60H 1/3233; F25D 21/14; F04D 29/403; F04D 29/4226
(Continued)

(56) References Cited

U.S. PATENT DOCUMENTS

| 5,755,107 A * | 5/1998 | Shirota | B60H 1/00028 |
| | | | 165/42 |
| 7,721,565 B2 * | 5/2010 | Williams | F24F 13/222 |
| | | | 62/285 |

(Continued)

FOREIGN PATENT DOCUMENTS

DE   102009023147 A1   12/2010
EP       1674310 A2    6/2006
(Continued)

OTHER PUBLICATIONS

English abstract for EP-2236327.
(Continued)

*Primary Examiner* — Allen Flanigan
*Assistant Examiner* — Filip Zec
(74) *Attorney, Agent, or Firm* — Fishman Stewart PLLC (57) ABSTRACT

An air-conditioning unit for air-conditioning an air flow may include a multipart housing including a first housing part and a second housing part arranged on top of the first housing part. The housing may further include an air-conditioning segment and a blower segment defining an axis of rotation. The blower segment may have a blower for driving the air flow. A suction chamber and a pressure chamber may be disposed in the blower segment, and the suction chamber and the pressure chamber may be open with respect to one another via a connecting opening. The blower may have an impeller arranged in the connecting opening. The impeller may include a suction side facing towards the suction chamber and a pressure side facing towards the pressure chamber. The housing may further include a connecting duct for fluidically connecting the blower segment to the air-conditioning segment.

20 Claims, 3 Drawing Sheets

(51) Int. Cl.
  *F24F 1/00*  (2011.01)
  *B60H 1/32*  (2006.01)
  *F24F 13/20* (2006.01)
  *F24F 13/22* (2006.01)

(58) Field of Classification Search
  USPC .......................................... 62/285; 165/122
  See application file for complete search history.

(56) References Cited

U.S. PATENT DOCUMENTS

| | | | |
|---|---|---|---|
| 8,186,974 B2* | 5/2012 | Lan | F04D 25/08 417/423.14 |
| 2012/0138697 A1* | 6/2012 | Richter | B60H 1/3233 236/49.1 |

FOREIGN PATENT DOCUMENTS

| | | |
|---|---|---|
| EP | 2000338 A1 | 12/2008 |
| EP | 2236327 A1 | 10/2010 |
| EP | 2388159 A2 | 11/2011 |

OTHER PUBLICATIONS

English abstract for DE-102009023147.
English abstract for EP-2388159.
English abstract for DE-102009009065.
German Search Report for DE-102014221955.8, mailed Jun. 29, 2015.

\* cited by examiner

Fig. 5

AIR-CONDITIONING UNIT

CROSS-REFERENCE TO RELATED APPLICATIONS

This application claims priority to German Patent Application No. 10 2014 221 955.8, filed Oct. 28, 2014, the contents of which are hereby incorporated by reference in its entirety.

TECHNICAL FIELD

The present invention relates to an air-conditioning unit for air conditioning an air flow, preferably in a motor vehicle.

BACKGROUND

An air-conditioning unit of the type in question is known from EP 2 236 327 A1, for example. It comprises a multipart housing, which has an air-conditioning segment and a blower segment. A blower for driving the air flow is arranged in the blower segment. For this purpose, the blower has an impeller and an electric motor for driving the impeller. During the operation of the blower, the impeller rotates about an axis of rotation. The blower can expediently be configured as a radial blower, and therefore the associated impeller is then configured as a radial impeller. The components of the air-conditioning unit which are required to air-condition the air flow, e.g. at least one air filter, an evaporator of a refrigeration circuit and at least one heating device, are then accommodated in the air-conditioning segment of the housing. The heating device can be configured as an electric heating device, e.g. as a PTC element, where PTC stands for positive temperature coefficient. A heating device of this kind can furthermore be configured as a heat exchanger, through which, on the one hand, the air flow to be air-conditioned and, on the other hand, a heat transfer medium of a heating circuit can flow.

Water can arise in air-conditioning units of this kind and must be discharged from the housing in order to avoid odours. It is primarily condensation at the evaporator of water carried along in vapour form in the flow which can occur here. In this case, the condensate can be discharged from the housing in a suitable manner. Moreover, there is also the possibility, especially in the case of vehicle applications, that the fresh air drawn in by the blower will already be carrying liquid water in droplet form. In this case, this water can be deposited in the housing on the suction side of the blower and on the pressure side of the blower.

The abovementioned EP 2 236 327 A1 discloses that water which is deposited in the housing can be discharged by means of a suction-side drainage path and by means of a pressure-side drainage path, wherein the two drainage paths are routed within the housing to a condensed water drain, through which condensed water and deposited water can be discharged from the housing.

Other air-conditioning units, the housing of which is equipped with at least one drainage path, are known from DE 10 2009 009 065 A1 and from EP 2 00 0 338 A1.

To improve the performance of the blower and/or to reduce the noise generated by the blower, EP 2 388 159 A2 and EP 2 292 935 A2, for example, disclose the formation on the housing of a blower tongue, which forms a wall segment for radially delimiting a pressure chamber in which the pressure side of the blower is situated. Here, the blower tongue is arranged at a transition from said pressure chamber to a duct leading away therefrom. It has been found that the geometry of this blower tongue has a decisive effect on the efficiency of the blower and on the noise generated by the blower.

SUMMARY

The present invention is concerned with the problem of indicating, for an air-conditioning unit of the abovementioned type, an improved embodiment which is distinguished, on the one hand, by an efficient blower and, on the other hand, by efficient drainage, while suitability for relatively simple manufacture is furthermore desired.

This problem is solved by the subject matter of the independent claim. Advantageous embodiments form the subject matter of the dependent claims.

The invention is based on the general concept of arranging, in the blower segment of the housing, on the pressure side of the blower or impeller, a blower tongue which forms a circumferential segment of a radial boundary wall of a pressure chamber in which the pressure side of the impeller is situated. Here, the wall segment forming the blower tongue is arranged at a transition from said pressure chamber to a connecting duct which connects the housing segment fluidically to an air-conditioning segment of the housing in order to carry the air flow from the pressure chamber to the air-conditioning segment during the operation of the air-conditioning unit. Moreover, a suction-side drainage path is provided, which begins in a cavity of the blower tongue and opens into a pressure-side drainage path. To enable the housing having the blower tongue to be produced in a relatively simple manner, it has a plurality of housing parts. In this case, a lower segment of the blower tongue is formed on a first housing part, said segment being hollow and having a closed upper side. An upper segment of the blower tongue is formed on a second housing part, which is placed on top of the first housing part, said upper segment being hollow and having an upper side open towards the suction chamber. The multipart housing is thus in two parts in the region of the blower tongue, thereby making it possible in principle to produce any desired geometry for the blower tongue, while its production remains relatively inexpensive. This is because the housing parts can be produced as injection mouldings or die castings or even as deep-drawn parts, wherein the hollow segments of the blower tongue are advantageous.

The relative indications "top" and "bottom" relate to a correct installation state of the air-conditioning unit.

Since the upper segment of the blower tongue has an upper side open towards the suction chamber, it is possible in principle that water which arises in the suction chamber will enter a cavity of the upper segment of the blower tongue. The suction-side drainage path is now connected to this cavity, allowing water which may enter the cavity to be discharged via the suction-side drainage path.

In this case, the blower is arranged in the blower segment in such a way that the impeller thereof is situated in a connecting opening which connects the pressure chamber to a suction chamber. In this way, the impeller can draw in air from the suction chamber and force or deliver it into the pressure chamber during the operation of the blower.

The construction of the housing in accordance with the invention enables the blower tongue to be implemented relatively inexpensively. At the same time, it is possible with the aid of the blower tongue to optimize the blower as regards efficiency and noise generation. Moreover, unwanted water accumulation within the blower tongue can be prevented by means of the suction-side drainage path, which is passed through the blower tongue.

According to an advantageous embodiment, the suction-side drainage path can pass through an interspace, which is formed between the closed upper side of the lower segment of the blower tongue and a lower side of the second housing part. Thus, the first housing part and the second housing part are deliberately matched to one another in such a way that said interspace, through which the suction-side drainage path can be routed, is formed. It is thus possible to dispense with additional measures for the implementation of drainage.

In another embodiment, a lower side of the upper segment of the blower tongue, said lower side facing the closed upper side of the lower segment of the blower tongue, can have at least one drainage opening, through which the suction-side drainage path passes. The upper section of the blower tongue is thus open and permeable to water on its lower side, making it easier to drain off water which arises in the cavity of the upper segment.

In another embodiment, the suction-side drainage path can pass between a wall surface of the first housing part which faces away from the pressure chamber and a wall surface of the first housing part which faces the pressure chamber and/or a wall surface of the second housing part which faces the pressure chamber. Here too, deliberate matching is performed in the shaping of the first housing part and/or the second housing part in order to integrate the drainage function without additional components.

In another embodiment, the first housing part can have, on its lower side, at least one through opening, which is arranged outside the pressure chamber and through which the suction-side drainage path passes. With the aid of this through opening, the drainage path can carry the water which arises in the blower tongue out of the subassembly formed by the first housing part and the second housing part.

In another embodiment, the suction-side drainage path can be routed to the pressure-side drainage path within the air-conditioning segment. In particular, it is possible here to select a point which is at a relatively low pressure level for bringing together the suction-side drainage path with the pressure-side drainage path, thus reducing the risk of the drained water flowing back from the pressure side to the suction side.

According to another embodiment, at least one air filter for filtering the air flow can be arranged in the air-conditioning segment, said filter separating a dirty side from a clean side. The suction-side drainage path can now expediently be routed on the clean side to the pressure-side drainage path. On the clean side, there is a relatively low pressure, with the result that the risk of water that has been separated out flowing back through the suction-side drainage path as far as the suction side of the blower is reduced.

In another embodiment, an evaporator of a refrigeration circuit can be arranged in the air-conditioning segment. In the air-conditioning segment, the housing can then have an evaporator pan, which is arranged underneath the evaporator and in which a water outlet opening is arranged. An embodiment in which the pressure-side drainage path is routed out of the housing through this water outlet opening is then advantageous. In other words, the evaporator pan which serves to collect condensate that can form during the operation of the evaporator is expediently also used to collect the drainage water. The drainage water can thus be discharged from the housing through the same water outlet opening as the condensed water. For example, a condensed water hose connecting the water outlet opening to an environment of the air-conditioning unit can be connected in a conventional manner to the housing.

According to an advantageous development, the housing can have, in the air-conditioning segment, a filter cover, which is arranged underneath the at least one air filter and has a collecting duct and a water outlet. The suction-side drainage path can now be routed in this collecting duct to the pressure-side drainage path. This can be implemented in a particularly simple manner.

According to another advantageous embodiment, the pressure-side drainage path can lead from the collecting duct through the water outlet and through a water inlet formed on the evaporator pan as well as through a guide duct formed on the evaporator pan to the water outlet opening. From the collecting duct, the pressure-side drainage path thus carries both drainage water arising on the pressure side and drainage water arising on the suction side, simplifying the drainage or discharge of the drainage water to the evaporator pan.

In another development, the water outlet of the filter cover can be connected fluidically to the water inlet of the evaporator pan by a water connection, thereby making it possible to bridge a gap between the filter cover and the evaporator pan. For example, the water connection can be configured as a rigid duct or, preferably, as a flexible hose. The use of a flexible hose allows simple adaptation to different embodiments of the air-conditioning unit, which can differ from one another through different relative positions between the water outlet and the water inlet within the housing.

For its part, the air-conditioning segment of the housing can be subdivided into a filter segment and into a heat transfer segment; while the filter segment contains at least one air filter, an evaporator of a refrigeration circuit and at least one heating device are arranged in the heat transfer segment. Particularly when the air-conditioning segment is subdivided in this way, there is also a local separation between the filter cover, which is situated in the filter segment, and the evaporator pan, which is situated in the heat transfer segment.

According to another advantageous embodiment, a cover, which covers the open upper side of the upper segment of the blower tongue, can be arranged on the second housing part on an upper side facing the suction chamber. With the aid of this cover, the cavity of the upper segment of the blower tongue can be closed and sealed off to a certain extent, ensuring that only a relatively small amount of water can enter the cavity. In the case of large quantities of water, however, water can enter the cavity past the cover but can be readily discharged via the suction-side drainage path. It is noteworthy here that the open upper side of the upper segment of the blower tongue is formed by an opening in the second housing part. Although this opening is closed to a certain extent by the cover, the opening itself remains present in the second housing part, with the result that the upper segment of the blower tongue has an open upper side, as before.

In a particularly compact embodiment, the housing can have, in the blower segment, a fresh air inlet open towards the suction chamber. This means that water-containing air can pass directly into the suction chamber, i.e. to the suction side of the blower, through the fresh air inlet during the operation of the air-conditioning unit. Thus, the risk that a relatively large amount of water will arise in the suction chamber is relatively great. However, it is a simple matter to discharge the water that arises on the suction side via the proposed suction-side drainage path.

The first housing part is advantageously configured as a deep-drawn part or as an injection-moulded part. In addition or as an alternative, the second housing part can be designed as a deep-drawn part or as an injection-moulded part. In particular, deep-drawn parts or injection-moulded parts of this kind made of plastic can be produced inexpensively. Here, the configuration of the upper segment of the blower tongue and of the lower segment of the blower tongue as hollow bodies simplifies the deep drawing or injection moulding of the housing parts.

According to another advantageous embodiment, the impeller can be arranged horizontally in the housing, with the result that its axis of rotation extends substantially vertically. In the case of a horizontal impeller or an upright axis of rotation, the suction chamber in the blower segment is arranged at the top, while the pressure chamber in the housing segment is arranged at the bottom. The relative indications "horizontal(ly)", "upright" and "vertical(ly)" each refer to the correct installation state of the air-conditioning unit. The blower is preferably a radial blower, the impeller of which is configured as a radial impeller.

Further important features and advantages of the invention will become apparent from the dependent claims, from the drawings and from the associated description of the figures with reference to the drawings.

It is self-evident that the features mentioned above and those which will be explained below can be used not only in the respectively indicated combination but also in other combinations or in isolation without exceeding the scope of the present invention.

Preferred embodiments of the invention are illustrated in the drawings and are explained in greater detail in the following description, wherein identical reference signs refer to identical or similar or functionally identical components.

DETAILED DESCRIPTION

Figure 1:
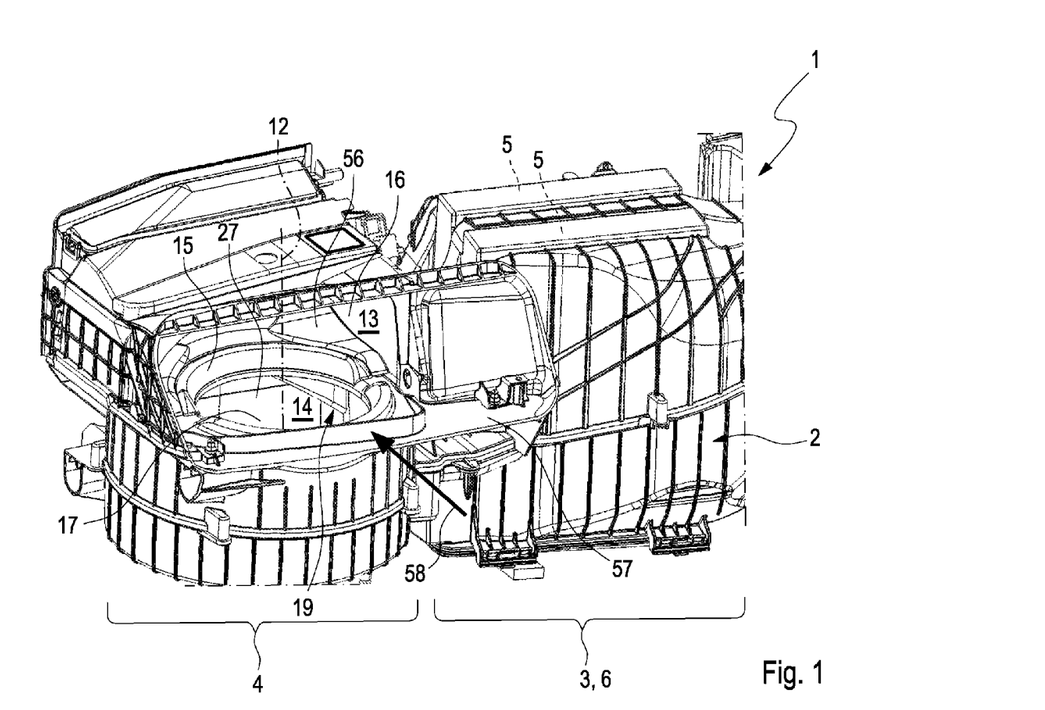
FIG. 1 shows an isometric view of an air-conditioning unit without the blower.

According to FIG. 1, an air-conditioning unit 1, which is used to air-condition an air flow and is preferably used in a motor vehicle, comprises a multipart housing 2, which has an air-conditioning segment 3 and a blower segment 4, which are each indicated by braces in FIG. 1. At least one filter element 5, an evaporator (not shown specifically in FIG. 1) of a refrigeration circuit and at least one heating device (likewise not shown specifically here) can be arranged in the air-conditioning segment 2. The air-conditioning segment 3 can furthermore be subdivided into a filter segment 6 and a heat transfer segment 7 (indicated in FIG. 5), in which case the respective air filter 5 is arranged in the filter segment 6, while the evaporator, as a cooling device, and the respective heating device are arranged in the heat transfer segment 7. An evaporator 8 of this kind and a heating device 9, which are arranged in the heat transfer segment 7 and in the air-conditioning segment 3, respectively, are furthermore indicated in a purely symbolic way in FIG. 5.

Figure 2:
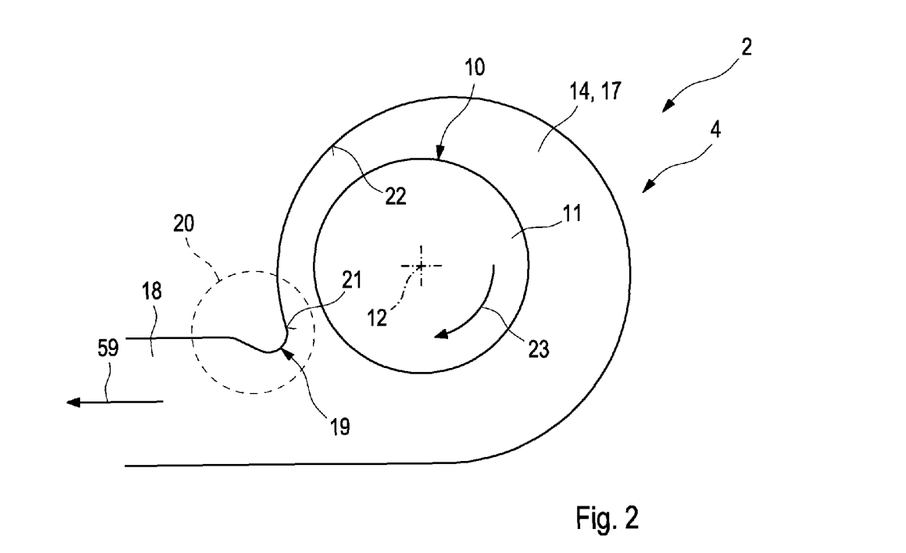
FIG. 2 shows a highly simplified sectional view of the air conditioning unit in the region of an impeller of the blower transversely to an axis of rotation of the impeller.

Arranged in the blower segment 4, on the other hand, is a blower 10, which is indicated in a highly simplified form only in FIG. 2 and is used to drive the air flow, which is indicated by an arrow in FIG. 2 and is denoted by 59. To drive the air flow 59, the blower 10 has an impeller 11, which rotates about an axis of rotation 12 during the operation of the blower 10. The blower 10 is preferably a radial blower. Accordingly, the impeller 11 is configured as a radial impeller 11. The blower 10 is furthermore expediently arranged in the blower segment 4 in such a way that the axis of rotation 12 extends substantially vertically, i.e. extends largely from the top down. As a result, the impeller 11 is arranged horizontally in the blower segment 4.

In the blower segment 4, the housing 2 has a suction chamber 13 situated at the top and a pressure chamber 14 situated at the bottom. Formed in the housing 2 is a connecting opening 15, via which the suction chamber 13 merges into the pressure chamber 14. The suction chamber 13 and the pressure chamber 14 are thus open with respect to one another via the connecting opening 15. The impeller 11 of the blower 10 is inserted into said connecting opening 15 in such a way that a suction side 16 of the impeller 11 is exposed to the suction chamber 13, while a pressure side 17 of the impeller 11 is exposed to the pressure chamber 14.

Accordingly, the sectional view shown in FIG. 2 shows a section through the housing 2 in the blower segment 4 in a section plane which extends perpendicularly to the axis of rotation 12 and which lies below the connecting opening 15, allowing the pressure chamber 14 and the pressure side 17 of the impeller 11 to be seen in FIG. 2. The housing 2 furthermore has a connecting duct 18, which is shown in part in FIG. 2. The connecting duct 18 carries the air flow 59 from the blower segment 4 to the air-conditioning segment 3 or filter segment 6. For this purpose, the connecting duct 18 opens onto the pressure chamber 14 on the inlet side. A blower tongue 19 is furthermore formed in the blower segment 4. This is situated at a transition 20 from the pressure chamber 14 to the connecting duct 18. Here, the blower tongue 19 forms a wall segment 21 for radially delimiting the pressure chamber 14. In this case, the term "radially" refers to the axis of rotation 12. According to FIG. 2, it is expedient if the impeller 11 is arranged eccentrically in the pressure chamber 14, in such a way that the pressure chamber 14 is of volute configuration to the outside of the impeller 11, wherein the cross section of the pressure chamber 14 radially between the impeller 11 and a wall 22 radially enclosing the impeller 11 increases in the direction of rotation 23 of the impeller 11. In this case, the wall segment 21 of the wall 22 which forms the blower tongue 19 is arranged in the region of the smallest cross section, and the impeller 11 thus rotates in the direction of the blower tongue 19 at its outer circumference.

Figure 3:
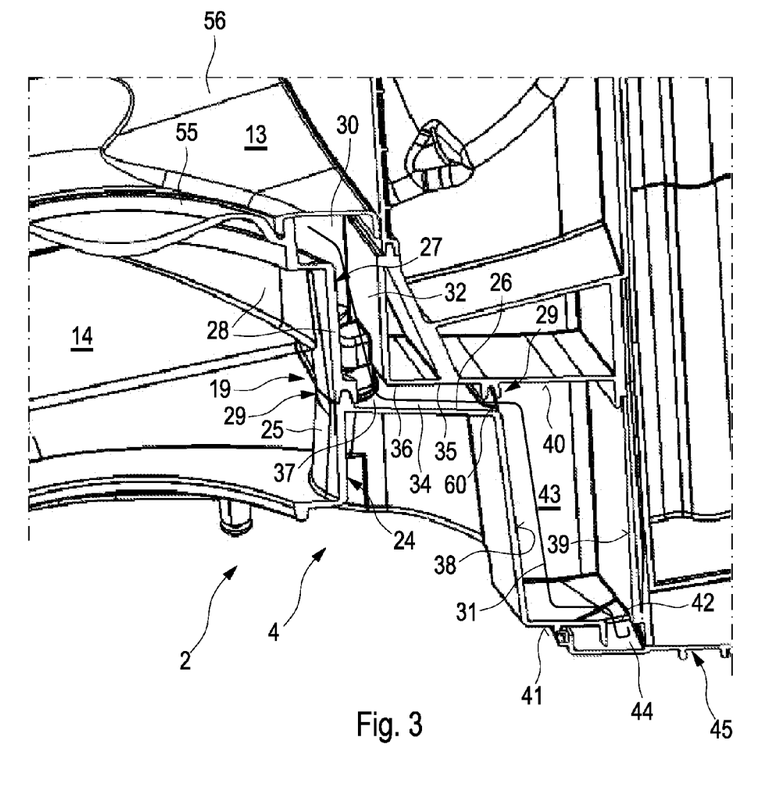
FIG. 3 shows an isometric sectional view of a housing of the air-conditioning unit in the region of a blower tongue.

According to FIG. 3, the housing 2 has a first housing part 24, on which a lower segment 25 of the blower tongue 19 is formed. The lower segment 25 of the blower tongue 19 is hollow, i.e. is configured as a hollow body, and has an upper side 26 of closed design. The housing 2 furthermore has a second housing part 27, on which an upper segment 28 of the blower tongue 19 is formed. For this purpose, the second housing part 27 is placed on top of the first housing part 24, wherein, in particular, at least one tongue and groove joint 29 can be provided in order to fix the upper, second housing part 27 on the lower, first housing part 24. The upper segment 28 of the blower tongue 19 is also hollow, i.e. configured as a hollow body, and therefore it contains a cavity 32, wherein it furthermore has an upper side 30 open towards the suction chamber 13.

Figure 4:
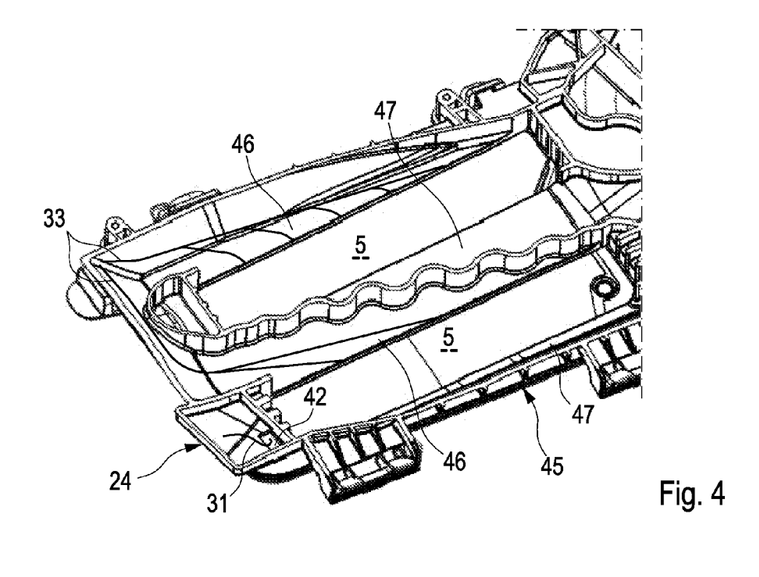
FIG. 4 shows an isometric sectional view of the housing in the region of a filter cover.
Figure 5:
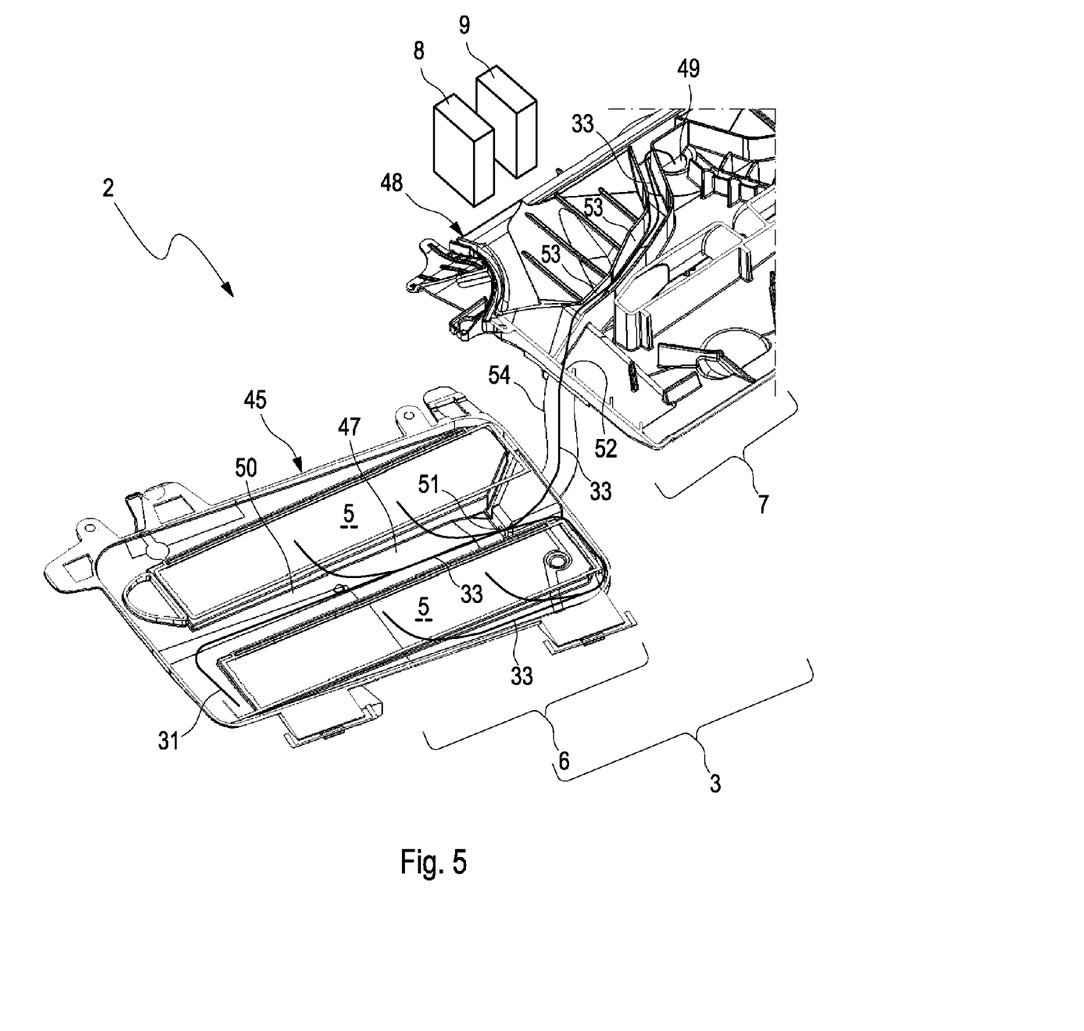
FIG. 5 shows an isometric sectional view of the housing in the region of the filter cover and in the region of an evaporator pan.

Also formed in the housing 2 is a suction-side drainage path 31, which leads from the cavity 32 of the upper segment 28 of the blower tongue 19 to a pressure-side drainage path 33, visible in FIGS. 4 and 5, which ultimately leads out of the housing 2. The suction-side drainage path 31 thus begins in the cavity 32, which is exposed to the suction chamber 13 and thus to the suction side 16 of the blower 10 via the open upper side 30 of the upper segment 28 of the blower tongue 19. In contrast, the pressure-side drainage path 33 begins on the pressure side 17 of the blower 10.

As can be seen from FIG. 3, the suction-side drainage path 31 is passed through an interspace 34, which is formed between the closed upper side 26 of the lower segment 25 of the blower tongue 19 and a lower side 35 of the second housing part 27. It can furthermore be seen from FIG. 3 that at least one drainage opening 37, through which the suction-side drainage path 31 passes, is provided on a lower side 36 of the upper segment 28 of the blower tongue 19. Here, said lower side 36 faces the closed upper side 26 of the lower segment 25 of the blower tongue 19. The suction-side drainage path 31 thus connects the cavity 32 of the upper segment 28 of the blower tongue 19 to the abovementioned interspace 34 via said drainage opening 37.

Moreover, the suction-side drainage path 31 leads between a wall surface 38 of the first housing part 24 which faces away from the pressure chamber 14 and a wall surface 39, 40 facing the pressure chamber 14. Here, one wall surface 39 is once again formed on the first housing part 24, while the other wall surface 40 is formed on the second housing part 27. It is noteworthy here that the suction-side drainage path 31 is passed through an aperture 60, which is formed in one of the abovementioned tongue and groove guides 29 by means of which the upper or second housing part 27 is fixed on the lower or first housing part 24. In the simplest case, the tongue, formed on the upper side 26 of the lower segment 25 of the blower tongue 19, of this tongue and groove joint 29 has a gap which forms said aperture 36 within the tongue and groove joint 29.

At least one through opening 42 is furthermore provided in a lower side 41 of the first housing part 24, said lower side being remote from the second housing part 27. Here, the through opening 42 is situated outside the pressure chamber 14. The suction-side drainage path 31 leads through this through opening 42. Here, the through opening 42 connects another interspace 43, which is delimited by the abovementioned wall segments 38, 39, 40, to a space 44 which is formed between the lower side 41 of the first housing part 24 and a filter cover 45, which already forms part of the air-conditioning segment 3 or filter segment 6.

In FIGS. 4 and 5, two air filters 5 and the installation positions thereof are indicated, said filters separating a dirty side 46 from a clean side 47 in the air-conditioning segment 3 or filter segment 6. It is expedient if the suction-side drainage path 31 shown in FIG. 5 is brought together with the pressure-side drainage path 33 on the clean side 47. Moreover, the suction-side drainage path 31 is brought together with the pressure-side drainage path 33 in the air-conditioning segment 3 or filter segment 6.

According to FIG. 5, the housing 2 has an evaporator pan 48 in the air-conditioning segment 3 or heat transfer segment 7, said pan being arranged underneath the abovementioned evaporator 8 and having a water outlet opening 49. A condensate drain hose (not shown here) can be connected to the water outlet opening 49 on an outer side of the housing 2. The pressure-side drainage path 33 is passed out of the housing 2 through this water outlet opening 49. In detail, the filter cover 45 has a collecting duct 50 and a water outlet 51. As can be seen, the suction-side drainage path 31 is routed in this collecting duct 50 to the pressure-side drainage path 33. Accordingly, the collecting duct 50 is arranged on the clean side 47. The pressure-side drainage path 33, which, from the collecting duct 50 onwards, contains the suction-side drainage path 31, leads from the water outlet 51 of the filter cover 45 to a water inlet 52 formed on the evaporator pan 48. Furthermore, the pressure-side drainage path 33 leads through a guide duct 53, which is likewise formed on the evaporator pan 48. The guide duct 53 connects the water inlet 52 to the water outlet opening 49. A water connection 54 connects the water outlet 51 to the water inlet 52. Here, the water connection 54 is preferably configured as a flexible hose. Configuration of the water connection 54 as a rigid duct is also conceivable in principle.

According to FIGS. 1 and 3, a cover 56 can be arranged on the second housing part 27 on an upper side 55 facing the suction chamber 13. Here, the cover 56 covers the open upper side 30 of the upper segment 28 of the blower tongue 19, thereby giving a certain protection to the cavity 32 from water which can arise in the suction chamber 13. However, this cover 56 is not watertight, and therefore water can enter the cavity 32 past the cover 56. This water can be discharged from the cavity 32 via the suction-side drainage path 31.

According to FIG. 1, the housing 2 has, in the blower segment 4, a fresh air inlet 57 which is open towards the suction chamber 13 and through which fresh air 58 can enter the suction chamber 13 as indicated by an arrow.

The first housing part 24 and the second housing part 27 are preferably produced as deep-drawn parts or as injection mouldings made of plastic.

If the impeller 11 is arranged horizontally in the housing 2, as here, the upright or vertical axis of rotation 12 is obtained. Consequently, the suction chamber 13 is arranged at the top, while the pressure chamber 14 is arranged at the bottom, below the suction chamber 13.

The invention claimed is:

1. An air-conditioning unit for air-conditioning an air flow, comprising:
a multipart housing including a first housing part and a second housing part arranged on top of the first housing part, the housing further including an air-conditioning segment and a blower segment defining an axis of rotation, the blower segment having a blower for driving the air flow arranged therein,
a suction chamber and a pressure chamber disposed in the blower segment, wherein the suction chamber and the pressure chamber are open with respect to one another via a connecting opening,
the blower having an impeller arranged in the connecting opening, wherein the impeller includes a suction side facing towards the suction chamber and a pressure side facing towards the pressure chamber,
the housing further including a connecting duct for fluidically connecting the blower segment to the air-conditioning segment,
a blower tongue defining a wall segment for radially delimiting the pressure chamber with respect to the axis of rotation, wherein the blower tongue is disposed in the blower segment at a transition from the pressure chamber to the connecting duct, the blower tongue having a lower segment disposed on the first housing part of the housing, wherein the lower segment is hollow and has a closed upper side, the blower tongue having an upper segment disposed on the second housing part of the housing, wherein the upper segment is hollow and has an upper side open towards the suction chamber, and a suction-side drainage path disposed in the housing, wherein the suction-side drainage path extends from a cavity of the upper segment of the blower tongue to a pressure-side drainage path leading out of the housing.

2. The air-conditioning unit according to claim 1, wherein the suction-side drainage path extends through an interspace disposed between the closed upper side of the lower segment of the blower tongue and a lower side of the second housing part.

3. The air-conditioning unit according to claim 1, wherein the upper segment of the blower tongue has a lower side facing the closed upper side of the lower segment of the blower tongue, wherein the lower side of the upper segment of the blower tongue has at least one drainage opening, and wherein the suction-side drainage path extends through the at least one drainage opening.

4. The air-conditioning unit according to claim 1, wherein the suction-side drainage path extends between a wall surface of the first housing part which faces away from the pressure chamber and a wall surface of at least one of the first housing part and the second housing part each of which face the pressure chamber.

5. The air-conditioning unit according to claim 1, wherein the first housing part has a lower side, the lower side of the first housing part including at least one through opening arranged outside the pressure chamber and through which the suction-side drainage path extends.

6. The air-conditioning unit according to claim 1, wherein the suction-side drainage path is routed to the pressure-side drainage path within the air-conditioning segment.

7. The air-conditioning unit according to claim 1, further comprising
at least one air filter for filtering the air flow arranged in the air-conditioning segment, wherein the at least one air filter separates a dirty side from a clean side in the air-conditioning segment, and
wherein the suction-side drainage path is routed on the clean side to the pressure-side drainage path.

8. The air-conditioning unit according to claim 1, further comprising
an evaporator of a refrigeration circuit arranged in the air-conditioning segment,
wherein the housing has an evaporator pan disposed in the air-conditioning segment, the evaporator pan being arranged underneath the evaporator and in which a water outlet opening is arranged, and
wherein the pressure-side drainage path leads out of the housing through the water outlet opening.

9. The air-conditioning unit according to claim 8, wherein the housing has a filter cover disposed in the air-conditioning segment, wherein the filter cover is arranged underneath the at least one air filter and has a collecting duct and a water outlet,
the suction-side drainage path being routed in the collecting duct to the pressure-side drainage path, and
wherein the pressure-side drainage path extends from the collecting duct through the water outlet, through a water inlet disposed on the evaporator pan and continues through a guide duct disposed on the evaporator pan, to the water outlet opening.

10. The air-conditioning unit according to claim 9, wherein
the water outlet of the filter cover is connected fluidically to the water inlet of the evaporator pan via a water connection, wherein the water connection is configured as at least one of a rigid duct and a flexible hose.

11. The air-conditioning unit according to claim 1, further comprising
a cover arranged on an upper side of the second housing part facing the suction chamber, wherein the cover closes the open upper side of the upper segment of the blower tongue.

12. The air-conditioning unit according to claim 1, wherein the housing has a fresh air inlet disposed in the blower segment and open towards the suction chamber.

13. The air-conditioning unit according to one of claim 1, wherein at least one of:
the first housing part is configured as a deep-drawn part or as an injection-moulded part, and
the second housing part is configured as a deep-drawn part or as an injection-moulded part.

14. The air-conditioning unit according to claim 1, wherein
the impeller is arranged horizontally in the housing such that the axis of rotation extends substantially vertically.

15. The air-conditioning unit according to claim 2, wherein the suction-side drainage path extends between (i) a wall surface of the first housing part facing away from the pressure chamber and (ii) a wall surface of at least one of the first housing part and the second housing part each of which face the pressure chamber.

16. The air-conditioning unit according to claim 15, wherein the suction-side drainage path is routed to the pressure-side drainage path within the air-conditioning segment.

17. The air-conditioning unit according to claim 2, wherein the suction-side drainage path is routed to the pressure-side drainage path within the air-conditioning segment.

18. The air-conditioning unit according to claim 5, wherein the first housing part is configured as a deep-drawn part or an injection-moulded part.

19. The air-conditioning unit according to claim 18, wherein the second housing part is configured as a deep-drawn part or an injection-moulded part.

20. An air-conditioning unit for air-conditioning an air flow in a motor vehicle, comprising:
a multipart housing including a first housing part and a second housing part disposed on top of the first housing part, the housing further including an air-conditioning segment and a blower segment defining an axis of rotation, the blower segment having a blower for driving the air flow arranged therein, wherein the housing further includes a connecting duct for fluidically connecting the blower segment to the air-conditioning segment;
a suction chamber and a pressure chamber disposed in the blower segment, wherein the suction chamber and the pressure chamber are open with respect to one another via a connecting opening;
the blower including an impeller arranged in the connecting opening, wherein the impeller has a suction side facing towards the suction chamber and a pressure side facing towards the pressure chamber;

a blower tongue defining a wall segment for radially delimiting the pressure chamber with respect to the axis of rotation, wherein the blower tongue is disposed in the blower segment at a transition from the pressure chamber to the connecting duct;

the blower tongue having a lower segment disposed on the first housing part of the housing, wherein the lower segment is hollow and has a closed upper side;

the blower tongue having an upper segment disposed on the second housing part of the housing, wherein the upper segment is hollow and includes an upper side open towards the suction chamber and a lower side facing the closed upper side of the lower segment, wherein the lower side of the upper segment includes at least one drainage opening; and a suction-side drainage path disposed in the housing, wherein the suction-side drainage path extends from a cavity of the upper segment of the blower tongue, through the at least one drainage opening of the lower side of the upper segment and an interspace disposed between the closed upper side of the lower segment and a lower side of the second housing part, and to a pressure-side drainage path leading out of the housing.

* * * * *

UNITED STATES PATENT AND TRADEMARK OFFICE
CERTIFICATE OF CORRECTION

PATENT NO. : 9,581,343 B2
APPLICATION NO. : 14/924426
DATED : February 28, 2017
INVENTOR(S) : Michael Berger et al.

It is certified that error appears in the above-identified patent and that said Letters Patent is hereby corrected as shown below:

In the Claims

At Column 10, Claim number 13, Line number 19, delete "one of" after "according to".

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*